US008938487B2

(12) United States Patent
Leung et al.

(10) Patent No.: US 8,938,487 B2
(45) Date of Patent: Jan. 20, 2015

(54) METHOD AND APPARATUS FOR DISPLAYING VIDEO DATA FROM MULTIPLE SOURCE COMPUTERS IN A MULTI-MONITOR COMPUTER SYSTEM

(75) Inventors: Andrew Leung, Calgary (CA); Mark McElhinney, Calgary (CA); Viktor Antonyuk, Calgary (CA)

(73) Assignee: SMART Technologies ULC (CA)

( * ) Notice: Subject to any disclaimer, the term of this patent is extended or adjusted under 35 U.S.C. 154(b) by 796 days.

(21) Appl. No.: 12/811,681

(22) PCT Filed: Jan. 7, 2009

(86) PCT No.: PCT/CA2009/000013
§ 371 (c)(1),
(2), (4) Date: Oct. 26, 2010

(87) PCT Pub. No.: WO2009/086629
PCT Pub. Date: Jul. 16, 2009

(65) Prior Publication Data
US 2011/0035448 A1    Feb. 10, 2011

Related U.S. Application Data

(60) Provisional application No. 61/019,553, filed on Jan. 7, 2008.

(51) Int. Cl.
*G09G 5/00* (2006.01)
*G06F 15/16* (2006.01)
*G06F 3/14* (2006.01)

(52) U.S. Cl.
CPC ............ *G06F 3/1454* (2013.01); *G06F 3/1423* (2013.01); *G06F 3/14* (2013.01); *G09G 5/001* (2013.01); *G09G 2370/04* (2013.01)
USPC ............................................ 709/201; 345/2.1

(58) Field of Classification Search
CPC .................. G06F 3/14; G06F 3/1423–3/1446; G06F 3/1454
USPC .............. 345/1.1–3.4; 715/761; 709/201–203
See application file for complete search history.

(56) References Cited

U.S. PATENT DOCUMENTS 6,813,777 B1    11/2004  Weinberger et al.
7,118,220 B2 *  10/2006  Castaldi et al. ................. 353/30
(Continued)

FOREIGN PATENT DOCUMENTS

JP           08-272740 A1    10/1996
WO           02/097729 A2    12/2002
WO    WO 2007036690 A1 *     4/2007

OTHER PUBLICATIONS

Johanson, Brad, Armando Fox, and Terry Winograd. "The interactive workspaces project: Experiences with ubiquitous computing rooms." Pervasive Computing, IEEE 1.2 (2002): 67-74.*
(Continued)

*Primary Examiner* — Patrice Winder
*Assistant Examiner* — Julian Chang
(74) *Attorney, Agent, or Firm* — Katten Muchin Rosenman LLP

(57) ABSTRACT

An apparatus, method and computer program product, for displaying video data from at least one source computer in a multi-monitor computer system, are provided. The apparatus includes a source computer interface for receiving at least video data from at least one source computer, and a multi-monitor interface for providing video data to multiple monitors. A processing structure coordinates routing of video data received via the multi-monitor interface to the monitors based on display requests received from the at least one source computer.

19 Claims, 8 Drawing Sheets

(56) References Cited

U.S. PATENT DOCUMENTS

| | | | |
|---|---|---|---|
| 7,222,356 B1 | 5/2007 | Yonezawa et al. | |
| 7,350,923 B2 * | 4/2008 | Olson et al. | 353/30 |
| 2002/0133611 A1 | 9/2002 | Gorsuch et al. | |
| 2003/0098819 A1 * | 5/2003 | Sukthankar et al. | 345/1.1 |
| 2004/0104862 A1 * | 6/2004 | Ogura | 345/1.1 |
| 2004/0243663 A1 * | 12/2004 | Johanson et al. | 709/200 |
| 2005/0036509 A1 * | 2/2005 | Acharya et al. | 370/466 |
| 2005/0091359 A1 * | 4/2005 | Soin et al. | 709/223 |
| 2005/0157218 A1 * | 7/2005 | Honma | 348/744 |
| 2006/0083194 A1 * | 4/2006 | Dhrimaj et al. | 370/328 |
| 2006/0233191 A1 * | 10/2006 | Pirzada et al. | 370/463 |
| 2007/0040900 A1 | 2/2007 | Castles | |
| 2007/0271514 A1 | 11/2007 | O'Neal et al. | |
| 2008/0068287 A1 * | 3/2008 | Day et al. | 345/1.2 |
| 2009/0061769 A1 * | 3/2009 | Zimbric et al. | 455/41.2 |
| 2010/0123645 A1 * | 5/2010 | Sridhar et al. | 345/1.2 |

OTHER PUBLICATIONS

Johanson, Brad, Armando Fox, and Terry Winograd. "The Interactive Workspaces Project: Experiences with Ubiquitous Computing Rooms [Version# 2, Apr. 11, 2002]."*

Liu, Qiong, et al. "Framework for effective use of multiple displays." Proceedings of SPIE Int. Symposium ITCom on Multimedia Systems and Applications VIII. 2005.*

Heider, Thomas, and Thomas Kirste. "Usable multi-display environments: concept and evaluation." Universal Access in Human-Computer Interaction. Ambient Interaction (2007): 93-102.*

Chiu, Patrick, Surapong Lertsithichai, and Qiong Liu. "Interaction Models for Multi-Display Slideshows." Pervasive 2007 (2007).*

Chiu, Patrick, et al. "Manipulating and annotating slides in a multi-display environment." Proceedings of INTERACT. vol. 3. 2003.*

Wallace, Grant, and Kai Li. "Virtually shared displays and user input devices." 2007 USENIX Annual Technical Conference on Proceedings of the USENIX Annual Technical Conference. USENIX Association, 2007.*

Heider, Thomas, Martin Giersich, and Thomas Kirste. "Resource optimization in multi-display environments with distributed grasp." Developing Ambient Intelligence (2006): 60-76.*

Chandra, Surendar, and Lawrence A. Rowe. "DisplayCast: a high performance screen sharing system for intranets." ACM Multimedia 2012 (2012).*

Chiou, Stefanie, et al. "A Plan-based Selfadaptive Intelligent Environment." (2002).*

International Search Report for International Application No. PCT/CA2009/000013 with a mailing date of Apr. 27, 2009.

Extended European Search Report for European Patent Application No. 09 70 1163, with a mailing date of Jun. 9, 2011.

Office action for Chinese Patent Application No. 200980106596.0 with a mailing date of Aug. 10, 2012.

* cited by examiner

METHOD AND APPARATUS FOR DISPLAYING VIDEO DATA FROM MULTIPLE SOURCE COMPUTERS IN A MULTI-MONITOR COMPUTER SYSTEM

This application is a national stage of PCT/CA2009/000013, filed on Jan. 7, 2009, which claims priority to U.S. Provisional Patent Application No. 61/019,553, filed on Jan. 7, 2008. Each of these documents is incorporated herein by reference in its entirety.

FIELD OF THE INVENTION

The following relates generally to multi-monitor computer systems and in particular, to an apparatus, method and computer program product for displaying video data from potentially multiple source computers in a multi-monitor computer system.

BACKGROUND OF THE INVENTION

The use of physical display devices for facilitating meetings is becoming increasingly popular. Depending on the environment, a physical display device may be one of a number of types (e.g. liquid crystal displays (LCDs), cathode ray tubes (CRTs), interactive whiteboards (IWBs) or other display panels etc.) and/or different sizes. Typically a physical display device is provided with video data from the video card in a single computing device such as a personal computer or the like, and positioned in a meeting room so as to be visible to all meeting participants. Such a physical display device is used to present slides, video data, photographs, charts and the like for use during presentations and for discussion. In meetings having multiple contributors, multiple physical display devices may be used and each connected in a one-to-one manner to a participant's respective computing device.

Multi-monitor computer systems comprise multiple physical display devices connected to a single computing device. Multi-monitor computer systems provide an increased display area for computer programs, and are becoming increasingly popular. In order to accommodate multiple physical display devices, video cards in many personal computers have multiple sockets to receive cables from more than one physical display device. Alternatively, some personal computers have multiple video cards to receive cables from more than one physical display device. In either case, video data generated by the video card(s) of the computing device in response to execution of one or more computer programs is output to a physical display device for display. Other multi-monitor computer systems have networked physical display devices where the physical display devices are connected via a wireless or wired network and video data is provided to the physical display devices via the network connection for display.

It is often desirable during a meeting to present video data from multiple source computing devices on a single physical display device. This is typically done by physically unplugging one of the physical display device's cables from one source computing device and plugging it into another. However it can be rather inconvenient and time-consuming to physically swap cables, especially in a multi-monitor computer system. Furthermore, physically removing a cable from a source computing device makes it impossible to display its video data along with another's simultaneously on the same physical display device.

As will be appreciated, improvements in the display of video data from multiple computing devices in multi-monitor computer systems are desired. It is therefore an object of the present invention at least to provide a novel method for displaying video data from multiple source computers in a multi-monitor computer system and a novel apparatus employing the method.

SUMMARY OF THE INVENTION

In accordance with an aspect, there is provided an apparatus for displaying video data from at least one source computer in a multi-monitor computer system, comprising:
  a source computer interface for receiving at least video data from at least one source computers;
  a multi-monitor interface for providing video data to multiple monitors; and
  a processing structure coordinating routing of video data via the multi-monitor interface to the monitors based on display requests received from the at least one source computer.

In accordance with another aspect, there is provided a method of displaying video data from at least one source computer in a multi-monitor computer system, comprising:
  receiving at least video data from at least one source computer; and
  coordinating routing of the received video data to respective monitors based on display requests received from the at least one source computer.

In accordance with another aspect, there is provided a computer readable medium embodying a computer program for displaying video data from at least one source computers in a multi-monitor computer system, the computer program comprising:
  program code receiving at least video data from at least one source computer; and
  program code coordinating routing of the received video data to multiple monitors based on display requests received from the at least one source computer.

In accordance with yet another aspect, there is provided a system comprising a plurality of monitors operatively associated with at least one computing device for receiving at least video data from at least one source computer and executing a display management procedure, the display management procedure coordinating routing of the received video data to respective ones of the monitors based on display requests received from the at least one source computer.

The apparatus, method, computer readable medium and system of the invention enable centralized coordination of the display of video data from at least one source computer on multiple monitors, at least reducing the need to plug and unplug physical cables, and generally easing the process by which video data from one or multiple source computers may be displayed and coordinated on multiple monitors.

BRIEF DESCRIPTION OF THE DRAWINGS

Embodiments will now be described more fully with reference to the accompanying drawings, in which.

DETAILED DESCRIPTION OF THE EMBODIMENTS

Figure 1:
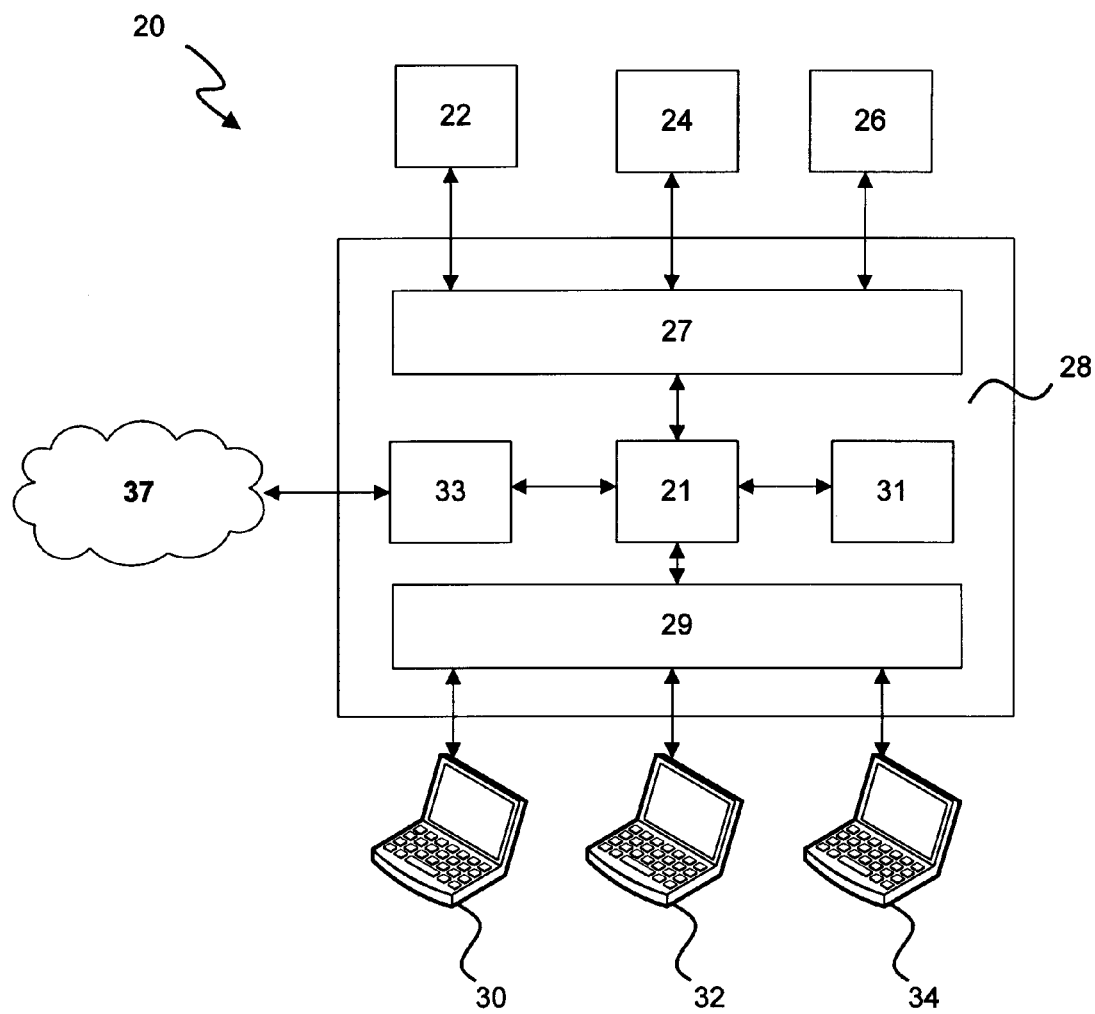
FIG. 1 is a schematic representation of a multi-monitor computer system.

Turning now to FIG. 1, a multi-monitor computer system is shown and is generally identified by reference numeral 20. As can be seen, in this embodiment the multi-monitor computer system comprises a plurality of physical display devices 22, 24 and 26, each of which is connected to a common computing device, in this case a central computer 28. The physical display devices 22, 24, 26 may take a variety of forms. For example, the physical display devices may be monitors (e.g. liquid crystal displays (LCDs), cathode ray tubes (CRTs), plasma display devices or other type of display panel) of the same type or of different types and/or may be of the same or different resolution. Alternatively, the physical display devices 22, 24, 26 may be interactive whiteboards (IWBs). Each IWB may be one of a number of types including but not limited to analog resistive, capacitive, camera-based, electromagnetic, surface acoustic wave etc. Of course, the physical display devices 22, 24, 26 may be a combination of monitors and IWBs. One or more other computing devices also communicate with the central computer 28. In this embodiment, three (3) laptop computers 30, 32, 34 are shown communicating with the central computer 28. The laptop computers 30, 32, 34 may communicate with the central computer 28 over wired communication links such as for example Ethernet or universal serial bus (USB) connections, or may communicate with the central computer 28 over wireless communication links such as for example radio frequency (RF) or Blue-Tooth™ connections. For the purposes of this application, "monitor" and "physical display device" will be used interchangeably to refer to any of a monitor as set out above, an IWB, or any other such physical display device.

Central computer 28 is arranged or programmed as will be described to display video data from the multiple source laptop computers 30, 32, 34 in the multi-monitor computer system, as will be described in further detail in the following paragraphs. Central computer 28 includes a source computer interface 29 for receiving video data from the multiple source computers 30, 32, 34. Depending upon the implementation, source computer interface 29 may be a single device for handling wired and/or wireless communications links with source computers 30, 32, 34, or comprise a set of source computer interface devices each of which handles communication with a respective one of source computers 30, 32, 34. Central computer 28 also includes a multi-monitor interface 27 for providing video data to monitors 22, 24 and 26. Depending upon the implementation, multi-monitor computer interface 27 may be a single device for handling wired and/or wireless communications links with monitors 22, 24, and 26, or comprise a set of monitor interface devices each of which handles communication with a respective one of monitors 22, 24, 26.

Central computer 28 includes a processor 21 that, under the instructions of software stored in non-volatile memory 31 and executed in system memory, coordinates the provision of received video data via the multi-monitor interface 27 to the monitors 22, 24, 26 based on requests from the source computers 30, 32, 34.

Memory 31, in addition to storing software for coordinating the multi-monitor computer system 20, stores user-adjustable and non-user-adjustable configuration parameters for use during the coordinating. Memory 31 is also configured to stored video data for optional screen capture and other purposes, such as for file sharing and transfer between and amongst source computers 30, 32, 34 and central computer 28, as desired. External memory devices (not shown) may be connected to central computer 28 for this purpose also.

Central computer 28 also includes a network interface 33 interconnected with the other components of central computer 28 to send and receive video data and handle display requests from remote source computers (not shown) via a network 37. Network interface 33 may also be used to provide access to another storage device (not shown). Communications with other remote source computers may be made via windows sharing software over an Internet, virtual private network (VPN) or similar communication link. The windows sharing software may be one of a variety of types such as that offered by SMART Technologies ULC of Calgary, Alberta, Canada, assignee of the subject application, under the name SynchronEyes™, Bridgit™ or LinQ™ or that offered by third parties under the name WebEx™, Microsoft Remote Desktop, Netmeeting, Windows Live™ or VNC™.

Figure 2:
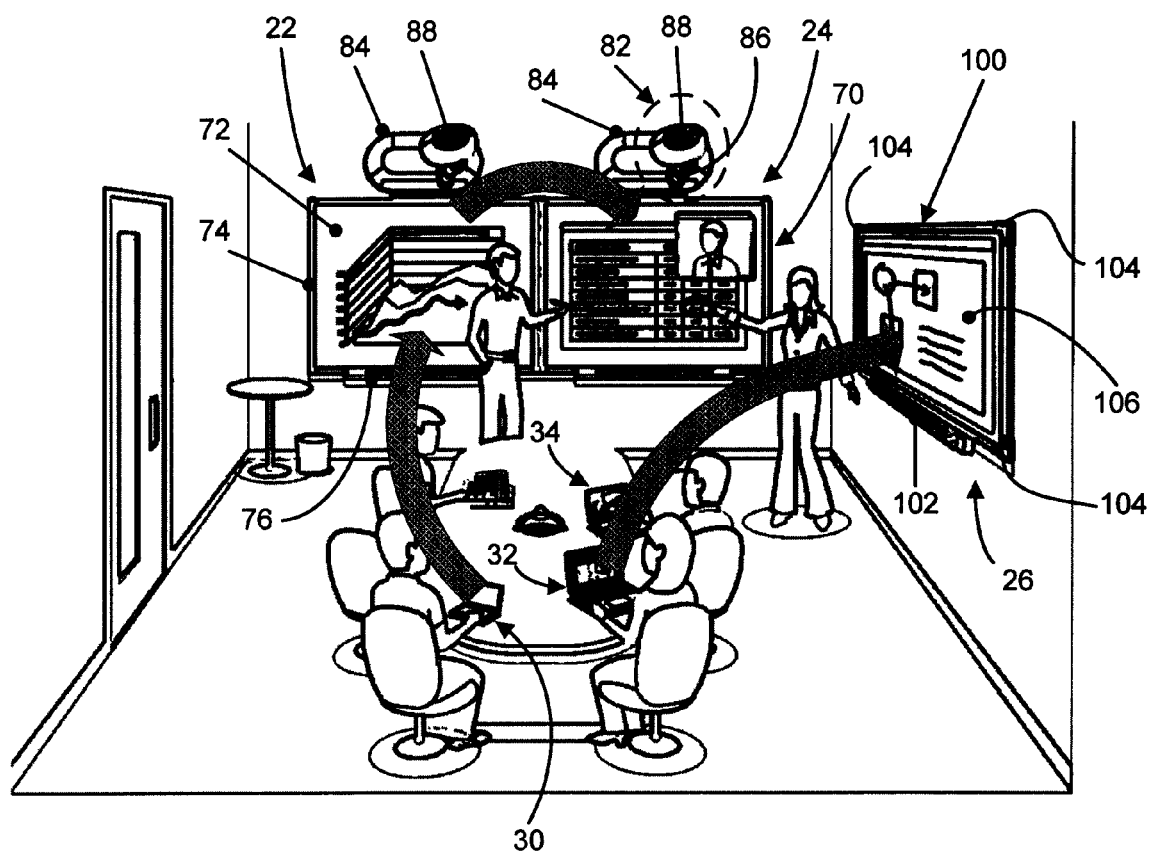
FIG. 2 shows a multi-monitor computer system deployed in a meeting room and comprising a plurality of interactive whiteboards and a plurality of laptop source computers connected to a single central computer.
Figure 3:
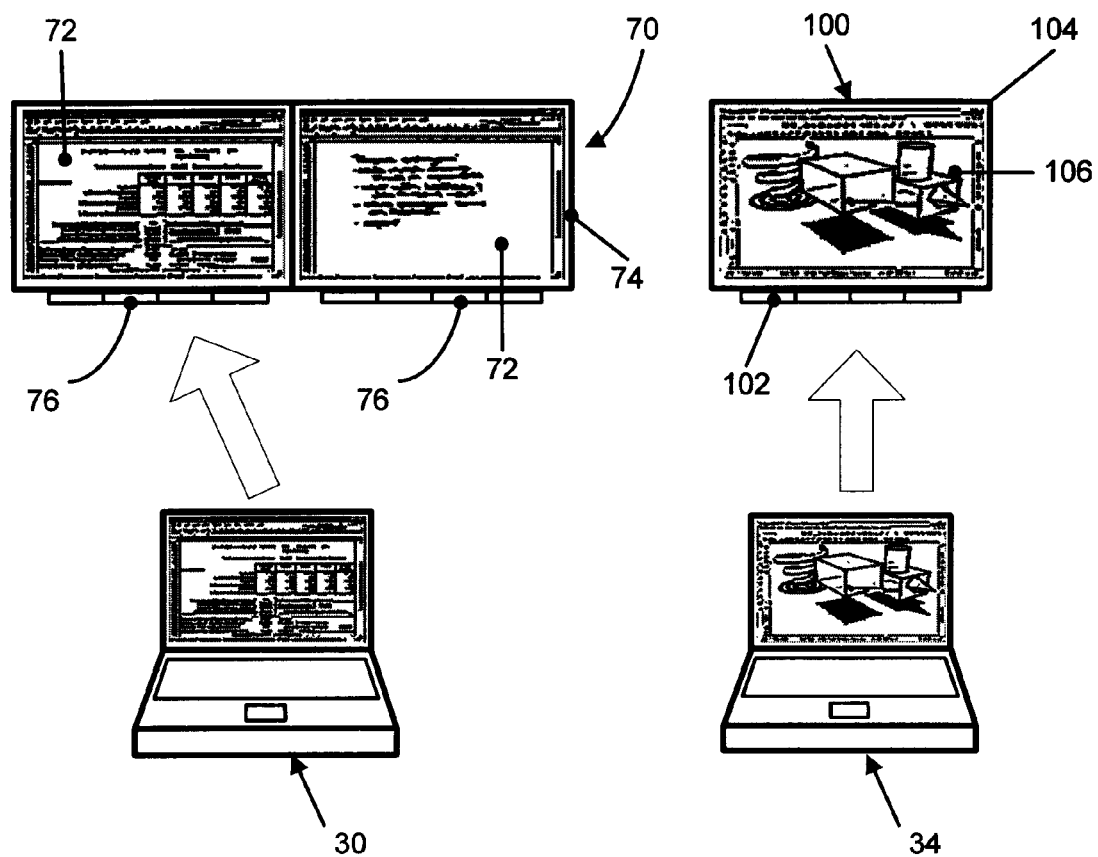
FIG. 3 shows the interactive whiteboards and two laptop computers of FIG. 2, video data from the two laptop computers being routed for display on respective ones of the interactive whiteboards.

FIGS. 2 and 3 show the multi-monitor computer system 20 deployed in a meeting room and with the physical display devices 22 to 26 taking the form of interactive whiteboards (IWBs) mounted on the walls of the meeting room at different spaced locations. Each IWB is connected to the central computer 28 (not shown) either via a cable that is received by a respective socket of a video card installed in the central computer 28 or via a network connection. The laptop computers 30 to 34 in this configuration communicate with the central computer 28 via wireless communication links. Alternatively, each IWB may comprise an embedded processing unit that controls its display and that receives communication directly from one or more of the laptop computers 30 to 34.

In this embodiment, IWBs 22 and 24 are 600i series interactive whiteboards manufactured by SMART Technologies ULC, of Calgary, Alberta, Canada, assignee of the subject application. As can be seen, each IWB 22, 24 comprises an analog resistive touch screen 70 having a touch surface 72. The touch surface 72 is surrounded by a bezel 74. A tool tray 76 is affixed to the bezel 74 adjacent the bottom edge of the touch surface 72 and accommodates one or more tools that are used to interact with the touch surface 72.

A boom assembly 82 is mounted above the touch screen 70 via a mounting bracket 84. The boom assembly 82 comprises a generally horizontal boom 86 that extends outwardly from the mounting bracket 84 and supports a projector 88 adjacent its distal end. The projector 88 is aimed at the touch screen 70 so that the image projected by the projector 88 is presented on the touch surface 72.

During operation of each IWB 22, 24, the projector 88 receives video output from the central computer 28 and projects a video image onto the touch surface 72. The video image may be the desktop of the central computer 28 or the desktop of one of the laptop computers 30 to 34. When a user contacts the touch surface 72 with a pointer such as a finger, pen tool, or other object, the contact is detected by the IWB and the position of the contact in touch screen (x,y) coordinates is conveyed to the central computer 28. The central computer 28 in response maps the touch screen (x,y) coordinates to the computer display coordinates and processes the resultant input. Depending on the nature of the resultant input, the touch surface contact may be treated as writing or drawing or as a mouse event. As a result, pointer contacts on and pointer movement across the touch surface 72 can be recorded by the central computer 28 as writing or drawing or used to control execution of one or more application programs loaded on the central computer 28. The central computer 28 also updates the video output conveyed to the projector 88 so that the video image presented on the touch surface 72 reflects the pointer activity.

IWB 26 is a DViT camera-based interactive whiteboard manufactured by SMART Technologies ULC, of Calgary, Alberta, Canada, assignee of the subject application and is similar to those described in U.S. Pat. Nos. 6,803,906; 6,972, 401; and 7,236,162, the contents of which are incorporated by reference herein in their entirety. The IWB 26 comprises a rectangular bezel or frame 100 surrounding the display screen of a projection device such as for example a plasma display or LCD. A tool tray 102 is affixed to the bezel 100 and accommodates one or more pen tools that are used to interact with the projection device. The projection device receives video output from the central computer 28 and displays a video image on its display screen 106. Digital cameras 104 are provided adjacent at least two corners of the bezel 100. The digital cameras 104 have overlapping fields of view that encompass and look across the display screen 106.

During operation, the digital cameras 104 acquire images generally looking across the display screen 106 from different viewpoints and generate image data. Image data acquired by the digital cameras 104 is processed by on-board digital signal processors to determine if a pointer exists in the captured image data. When it is determined that a pointer exists in the captured image data, the digital signal processors generate pointer information packets (PIPs) and convey the PIPs to a master controller. Upon receipt of the PIPs, the master controller processes the PIPs using triangulation to determine the location of the pointer in the captured images relative to the display screen (x,y) coordinates. In this manner, as PIPs are generated in response to captured images, the position and movement of the pointer over the display screen 106 can be tracked turning the display screen 106 of the projection device into an interactive touch surface. The display screen (x,y) coordinates generated by the master controller are conveyed to the central computer 28. Similarly, the central computer 28 in response maps the display screen (x,y) coordinates to computer display coordinates and processes the resultant input. Depending on the nature of the resultant input, the display screen 106 contact may be treated as writing or drawing or as a mouse event. As a result, pointer contacts on and pointer movement across the display screen 106 can be recorded by the central computer 28 as writing or drawing or used to control execution of one or more application programs loaded on the central computer 28. The central computer 28 also updates the video output conveyed to the projection device so that the video image presented on its display screen 106 reflects the pointer activity.

Figure 4A:
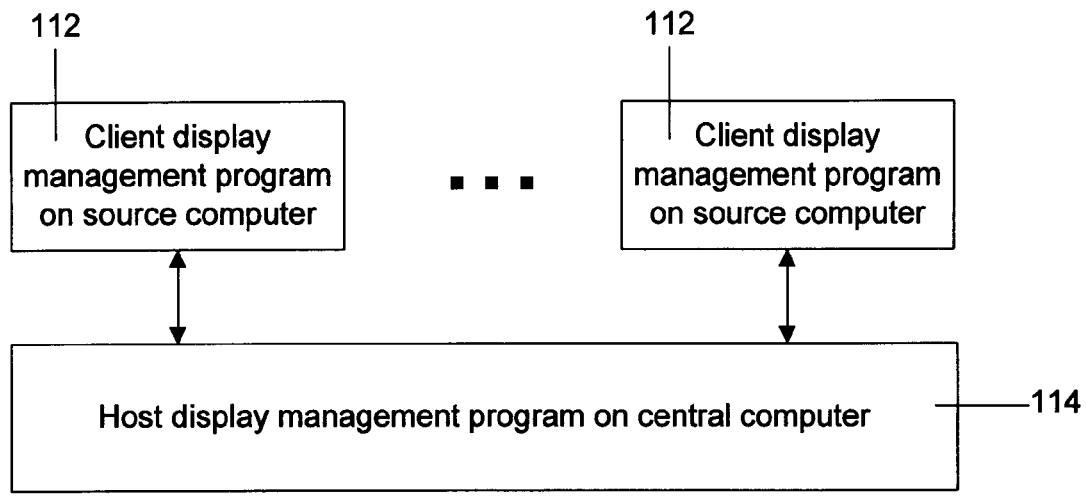
FIG. 4a is a schematic representation of client display management programs running on respective source computers interacting with a host display management program running on the central computer.

FIG. 4A shows the software structure of the multi-monitor computer system 20 that executes a display management procedure. Each source computer 30, 32, 34 runs a client display management program 112, which is capable of communicating with the host display management program 114 running on the central computer 28. The client display management program 112 passes a video data display request initiated by a user of source computer 30 to the host display management program 114 at central computer 28. Client display management program 112 also handles sending of video data to the host display management program 114 once a display request has been granted by the host display management program 114 either automatically or by its user, typically a meeting moderator or administrator, as will be described.

According to an embodiment, the host display management program 114 polls source computers 30, 32, 34 to determine whether they are ready to provide, or share, video data. The host display management program 114 makes the determination, either in conjunction with user input or automatically, as to whether a display request is granted and to which monitor video data is to be routed. The host display management program 114 sends grant/deny/wait messages to client display management programs 112 running on respective source computers 30, 32, 34 to indicate if respective display requests have been allowed, denied, or are being queued due to the present unavailability of a monitor. According to this embodiment, other information, such as for example, monitor identifiers, monitor availability messages including which source computer is currently associated with a particular monitor, available screen resolutions for monitors 22, 24, 26 and source computers 30, 32, 34 are also exchanged between the source computer 30, 32 or 34 and the central computer 28.

Figure 4B:
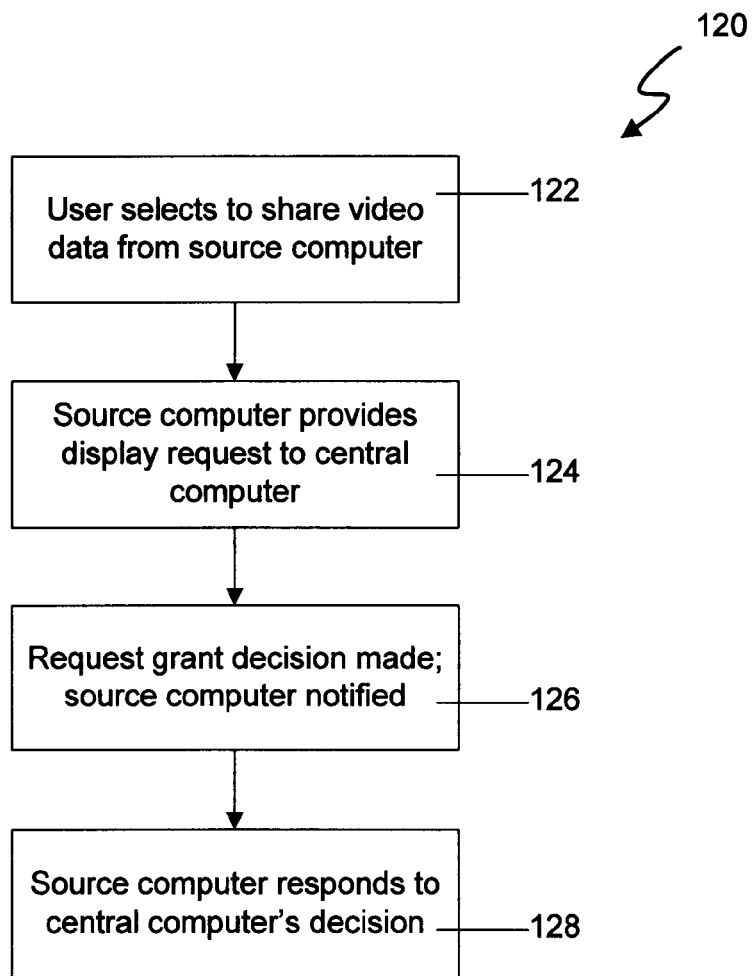
FIG. 4b is a flowchart showing steps for sharing video data.

FIG. 4b is a flowchart 120 showing steps for sharing video data and thereby providing the video data to central computer 28 as initiated by a user of one of the source computers 30, 32, 34. Using the interface of the client display management program 112 running on a source computer 30, the user of source computer 30 selects to share video data (step 122). Based on the selection, a display request is provided by the client display management program 112 running on source computer 30 to the host display management program 114 running on central computer 28. Central computer 28 is thereby informed that source computer 30 is available to provide video data for displaying on one of the monitors 22, 24, 26. Central computer 28 then decides if the display request is to be granted (step 124).

In order to facilitate coordination of monitor display requests to the satisfaction of the users, host display management program 114 provides each client display management program 112 running on respective source computers 22, 24, 26 with monitor identifiers. Each monitor identifier uniquely identifies a monitor 30, 32, 34 for which central computer 28 coordinates the routing of video data. The source computers 30, 32, 34 can then present the monitor identifiers to their respective users for assisting with selecting a monitor for display, and display requests initiated by the users can accordingly include monitor identifiers corresponding to users' choices. Host display management program 114 also provides, in association with respective monitor identifiers an availability message indication which monitors 30, 32, 34 are already associated with a source computer, as will be discussed in connection with FIG. 6.

Figure 5A:
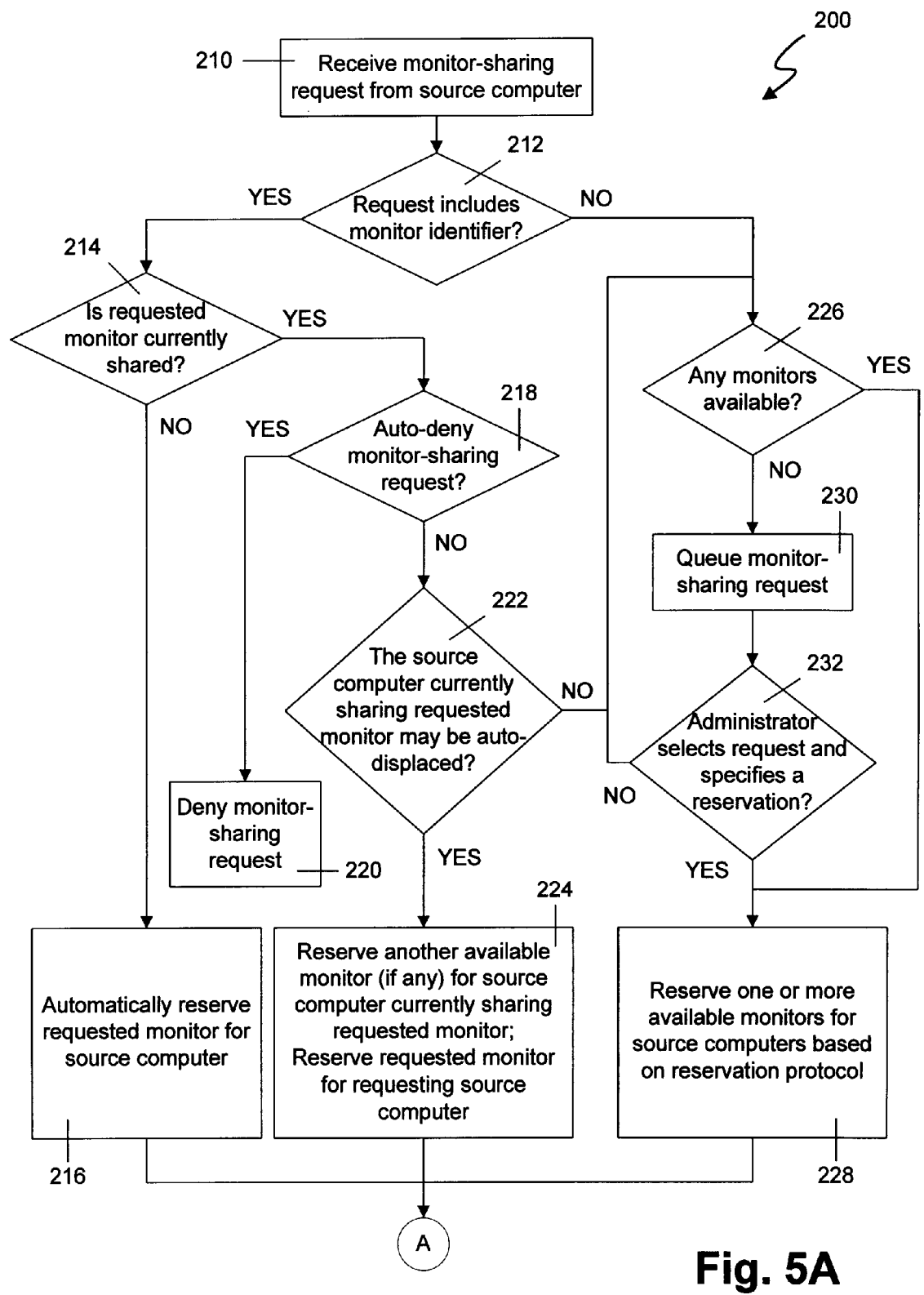
FIGS. 5A to 5B show a flowchart of a process for creating an association between a requesting source computer and a monitor, and for displaying video data from the requesting source computer on the monitor.
Figure 5B:
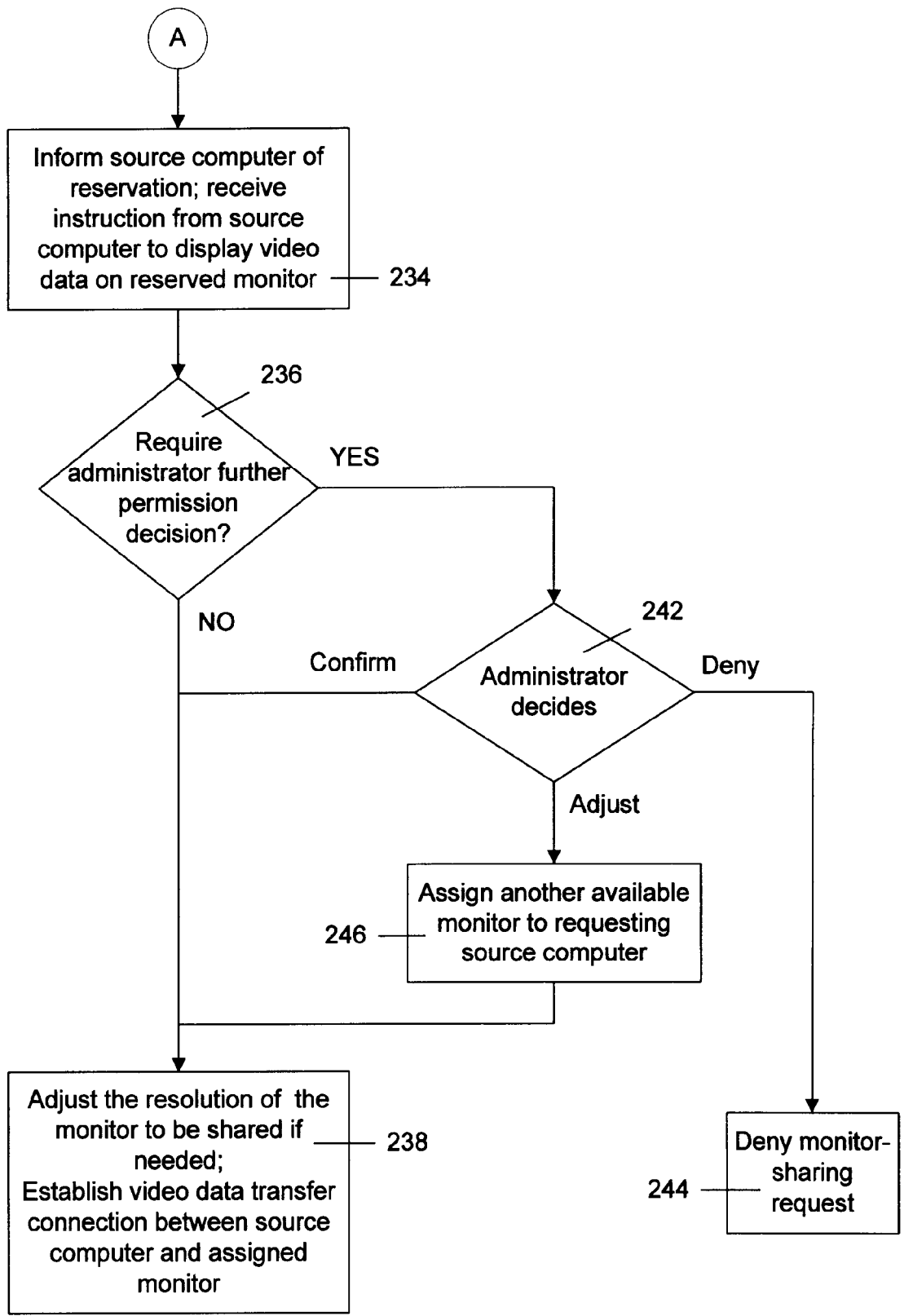

FIGS. 5a and 5b show a flowchart of a process 200 for sharing the video data of a source computer 30 to one of monitors 22, 24, 26, based on a display request received at central computer 28 from source computer 30 (step 210). If the display request includes a monitor identifier identifying the particular monitor that the user of source computer 30 would like to send video data to (step 212), then a check is made to determine whether the particular requested monitor is already associated with (or "shared to") another source computer (in this case, source computer 32 or 34). This will be the case if the particular requested monitor is actually displaying the video data of another source computer (step 214), or if an association has been established and display of the video data on the requested monitor is imminent. If the particular requested monitor is not already shared to another source computer, then the requested monitor is reserved by central computer 28 for the requesting source computer 30 (step 216). More particularly, an electronic reservation record in memory 31 is created that associates source computer 30 with the requested monitor.

Once the association has been established in this manner, the requesting source computer 30 is then informed of the reservation (step 234). Upon having been informed of the reservation, requesting source computer 30 generates and sends to central computer 28 an instruction to display the video data on the reserved monitor 22.

The instruction to display video data on the reserved monitor is then compared to the reservation record in memory 31 to ensure that source computer 30 is indeed entitled to display video data on reserved monitor 22. A check is then made to determine whether further permission to display is required by an administrator/moderator (step 236). In this embodiment, the administrator/moderator is the user of the central computer 28. In the event that further permission is required, the administrator/moderator is provided with a dialog box as part of a user interface on the local screen (not shown) of central computer 28 and is given the opportunity to grant or deny the reservation. The administrator/moderator is also given the opportunity to modify the electronic reservation record or create a new electronic reservation record to in effect associate the requesting source computer 30 with an alternative monitor (step 242). If the administrator denies the request, the source computer 30 receives a deny-monitor-sharing-request message, and does not forward video data to the requested monitor via central computer 28 (step 244). If the administrator confirms the reservation then the resolution of the reserved monitor is automatically adjusted by central computer 28 according to a display instruction provided by the source computer 30 including display parameters (if needed), and a video data transfer connection is established between the source computer 30 and the central computer 28 such that the video data is provided to the reserved monitor for display (step 238). In the event that the administrator chooses to adjust the reservation by associating another available monitor with the requesting source computer 30, either the electronic reservation request is modified accordingly, a new electronic reservation request is created to replace to original, or despite the electronic reservation request video data is routed by central computer 28 to the alternative monitor (step 246), and then the process goes to step 238.

In an alternative embodiment, the host display management program automatically decides whether to confirm or deny the reservation, or assign a different, available monitor to the requesting source computer 30. After the decision is made (e.g., at step 238 or step 244), the electronic reservation record of the reserved monitors that are not assigned to the source computer 30 are preferably deleted.

In the event that, at step 214, the requested monitor is currently displaying video data and therefore already shared, then a check is made at step 218 to determine whether to automatically deny the new display request. The decision whether to automatically deny the display request in the event that the requested monitor is currently shared is preferably based on a user-adjustable setting of the host display management program 112 running on central computer 28. Based on this setting, the request may be denied at this point (step 220). Otherwise, a check is made to determine whether the source computer currently sharing the requested monitor can be displaced (step 222) such that the current source computer is dissociated from the requested monitor and the requesting source computer 30 is associated with the requested monitor. The decision whether to automatically displace the existing monitor-sharing is preferably based on a user-adjustable setting of the host display management program 114 running on central computer 28.

In the event that the existing monitor-sharing can be displaced, an attempt is made to reserve another available monitor for the source computer that is about to be displaced, and the requested monitor is reserved for the requesting source computer 30 (step 224). The process then moves to step 234, and continues as has been described above.

If at step 222 the existing association between the requested monitor and its current source computer may not be displaced, then a check is made at step 226 as to whether there are any monitors available. A monitor is considered available if it is not displaying video data of (eg. "shared to") a source computer. In the event that at least one monitor is available, one of the available monitors is reserved for the requesting source computer based on a reservation protocol (step 228). The details of the reservation protocol may include rules such as, for example, choosing a monitor based on the particular socket in central computer 28 to which the requesting source computer is connected (if a wired connection). Other rules such as the order in which the requesting source computer was selected to share video data by its user, the particular socket in central computer 28 to which the next available monitor is connected (if a wired connection), the order in which the monitor was connected to the central computer 28, or the order of the most recent monitor use. Other such rules and protocols of rules may be employed.

The requesting source computer is then informed about the reservation (and that the requested monitor is not available) (step 234), and the process continues as has been described above. In this instance, a dialog box pops up to inform the user of the requesting source computer that the requested monitor is unavailable, but that one or more alternative monitors may be selected.

In the event that, at step 226, there are no available monitors, then the display request from the requesting source computer is queued in memory 31 (step 230) until the administrator using central computer 28 selects the request and specifies a monitor reservation for the requesting source computer (step 232), or until a monitor becomes available (step 226). At this point, the process then continues from step 228 as has been described above.

In the event that, at step 212, the display request from the requesting source computer does not include a monitor identifier, then the process continues immediately at step 226 to determine whether any of the monitors are available, and if so a monitor is selected automatically or by administrator/moderator selection, depending upon the protocol as described above and the settings of host display management program 114.

Figure 6:
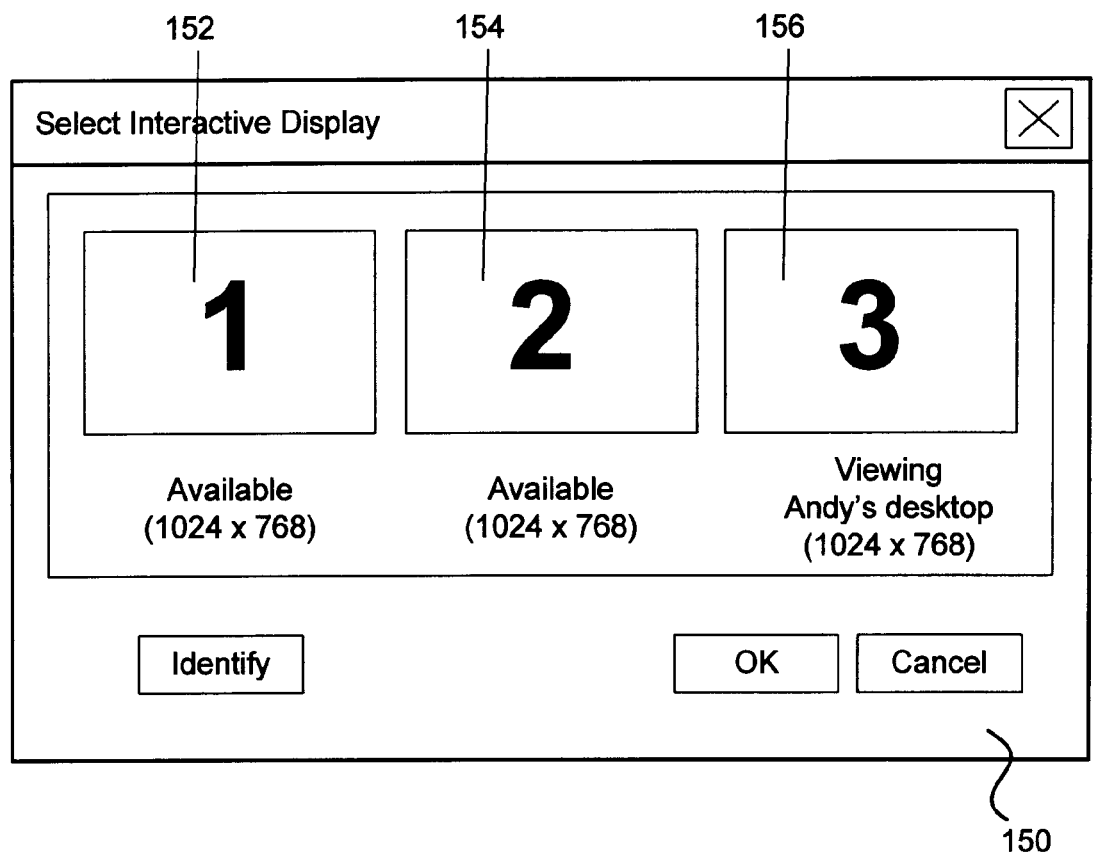
FIG. 6 is a diagram of a dialog box caused to be displayed at a source computer for selecting a monitor on which it is desired to display video data.

FIG. 6 is a diagram of a dialog box 150 displayed locally at central computer 28 or at a source computer 30, 32, 34 for selecting a monitor 22, 24, 26 for displaying video data. As indicated above, this dialog box enables the user to view the monitor identifiers corresponding to the monitors with which central computer 28 is in communication, as well as status and resolution information. For example, as illustrated in FIG. 6, the third monitor 156 is currently displaying the desktop of Andy's source computer, and the first and second monitors 152 and 154 are available for displaying video data from other source computers with which central computer 28 is in communication.

Figure 7:
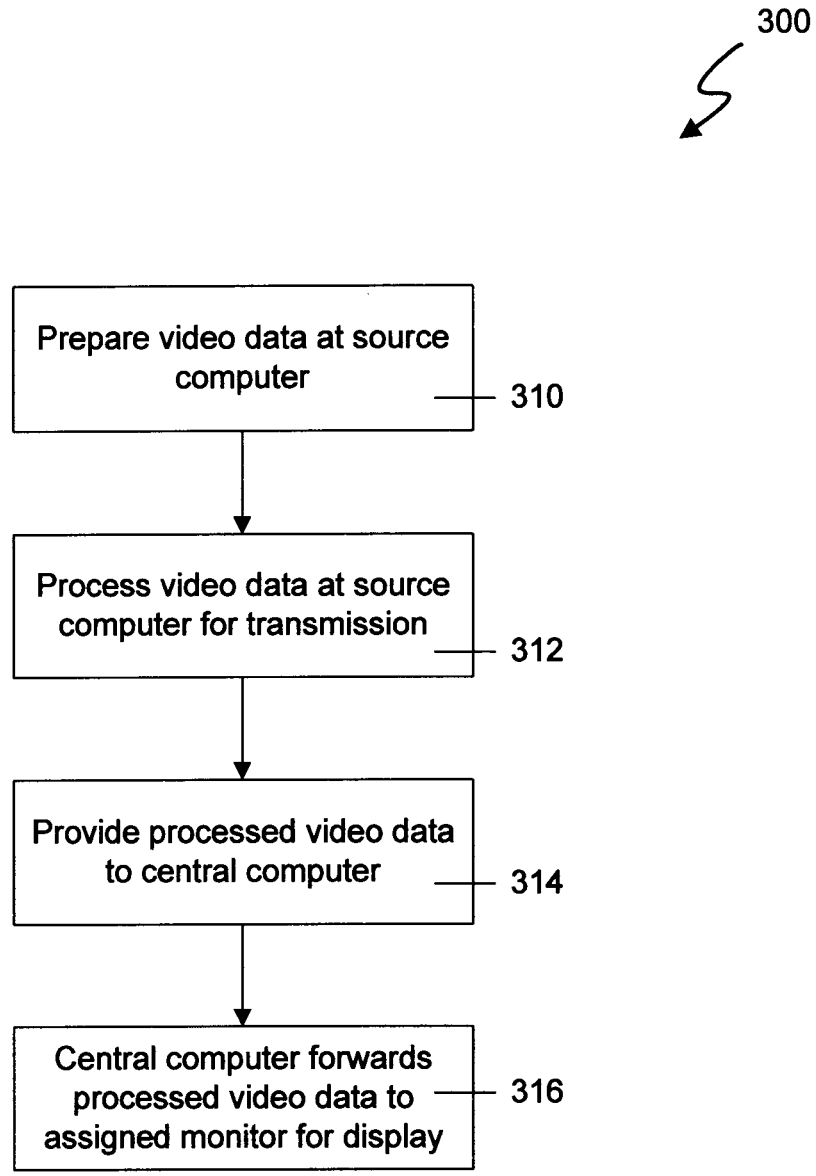
FIG. 7 is a flowchart showing a process for providing video data from a source computer to an associated monitor.

FIG. 7 is a flowchart showing a process 300 for providing video data from a source computer 30 to an associated monitor at step 238. The video data is prepared at source computer in the same way that video data is prepared for the local display of source computer (step 310). The video data is then processed into a format suitable for transmission to central computer 28 across the wired or wireless connection between the source computer 30 and the central computer 28 (step 312). In an embodiment, the video data is compressed and encoded in order to maintain the integrity of the video data during transmission, and to reduce the amount of video data being sent. The processed video data is then sent to the central computer 28 (step 314) and, routed to the associated monitor for display (step 316).

It will be understood that a fully functioning multi-monitor computer system 20 may have many local and/or remote source computers 30, 32, 34 and many monitors 22, 24, 26 under simultaneous coordination so as to achieve useful and simultaneous display of video data in real-time from the multiple source computers in the multi-monitor computer system 20.

While embodiments employing a single central computer 28 have been described, it will be understood that multiple such computers 28 may be interconnected so as to provide greater scope for display of video data from multiple sources. For example, multiple meeting sites, each having a respective central computer 28, could be interconnected via a peer-to-peer connection between the central computers 28. This would enable source computer video data connected to one central computer 28 at one meeting site to be shared via the peer-to-peer connection with meeting participants at another meeting site, and vice-versa. To assist with coordination of this scope of system, it might be useful to designate via configuration settings that one or more monitors in a meeting room are "remote" monitors, whereas the remainder of the monitors are "local". This might be achieved by limiting the monitor choices available to local source computers in order to provide video data to those monitors reserved as remote.

While embodiments have been described whereby a user of a source computer is able to request a monitor using a number or the graphical user interface, other methods may be used. For example, a monitor connection code may be required to be possessed beforehand by the user of the requesting source computer when making a display request so as to facilitate a level of security and coordination as to which monitors certain users are permitted to display video data from the source computers they are operating. Certain qualified users may receive their unique monitor connection codes prior to the meeting, enabling the qualified users to provide video data to certain monitors using their unique connection code, while preventing other meeting attendees with source computers that are connected to the network from doing so.

It will be understood that the invention described above is not limited for use with laptop source computers, but may be used with various types of portable computers such as cellular telephones, PDAs (personal digital assistants), or desktops, functioning as source computer and/or central computer 28.

Appendix A is software code and commentary regarding the same for finding a Host (central) computer's monitor information including identifier, sending the Host's Monitor information to the remote (source) clients, and prompting the remote (source) client for a Monitor to display on, for use during identifying the monitor as described above.

The apparatus described above for displaying video data from multiple source computers in a multi-monitor computer system and described methods may comprise or be implemented in whole or in part by program modules including but not limited to routines, programs, object components, data structures etc. and may be embodied as computer readable program code stored on a computer readable medium. The computer readable medium is any data storage device that can store data, which can thereafter be read by a computer system. Examples of computer readable media include for example read-only memory, random-access memory, USB keys, Flash Memory (such as SD cards), CD-ROMs, magnetic tape and optical data storage devices. The computer readable program code can also be distributed over a network including coupled computer systems so that the computer readable program code is stored and executed in a distributed fashion.

While embodiments described herein include source computers initiating provision of display requests to central computer 28, alternatives are possible. For example, central computer 28 could initiate periodic polling of its hardware connections for "share" status of the source computers 30, 32, 34 as a form of display request, indicating that one or more source computers are available to provide video data.

Although particular embodiments have been described above, those of skill in the art will appreciate that variations and modifications may be made without departing from the spirit and scope thereof as defined by the appended claims.

APPENDIX A

1) Finding the Host Computer's Monitor Information
The following monitor code is available at:

```
svn://calsvn0/LinQ/trunk/Source/libSharedData/MonitorData.cpp
svn://calsvn0/LinQ/trunk/Source/libSharedData/MonitorData.h
Information about the different displays on a system is retrieved
using an Enumerating function:
HDC hdcScreen = ::GetDC(0);
EnumDisplayMonitors(hdcScreen, NULL, MonitorEnumProc,
(LPARAM)this);
::ReleaseDC(0, hdcScreen);
```

The enumerating function is as follows:

```
// enumeration function originally written by Dan Mitchell as part of
// Bridgit Conferencing Software
BOOL CALLBACK MonitorEnumProc(HMONITOR hmon, HDC
hdcmon, LPRECT rectmon, LPARAM lparam)
{
    CMonitorData* pData = (CMonitorData*)lparam;
    MONITORINFOEX mix;
    mix.cbSize = sizeof(mix);
    int iMonitor = pData->GetMonitorCount( );
    int iDepth = GetDeviceCaps(hdcmon, BITSPIXEL);
    iDepth *= GetDeviceCaps(hdcmon, PLANES);
    GetMonitorInfo(hmon, (MONITORINFO *)&mix);
    // Use the data structure that is already in the array (it's a
// statically defined array).
    // Use the existing value in case we have problems reading
the
// colour depth when they've locked their desktop. (rather than
// creating a whole new sMONITOR structure).
IMonitorModel::sMONITOR monNew = pData-
>GetMonitorByIndexUnchecked(iMonitor);
    monNew.rcMonitor = mix.rcMonitor;
    monNew.csName = mix.szDevice;
    monNew.hMon = hmon;
    monNew.bPrimary = (mix.dwFlags &
MONITORINFOF_PRIMARY);
    monNew.iDepth = iDepth;
```

```
        // If they've locked their desktop, then we can get -1 for this
// under Windows XP because
        // (guessing) the call to enumdisplaymonitors goes wrong
somehow.
        // In that case, use the
        // last value we had, as long as __that__ value is valid.
        if(monNew.iDepth == -1)
        {
                if(monNew.iLastDepth == -1)
                {
                        // This is very bad news -- we have no idea what
to
// do in this case, so let's just guess at 32bpp.
// It's got a pretty good chance of being wrong, but
// -1 is a __lot__ more wrong..
                        monNew.iDepth = 32;
                }
                monNew.iDepth = monNew.iLastDepth;
        }
        monNew.iLastDepth = monNew.iDepth;
        // Now add the new monitor
        pData->AddMonitor(monNew);
        return TRUE;
}
```

2.) Sending the Host's Monitor Info to the Remote Clients
Once we have the monitor information of the Host PC, we can send it to the client PC so it knows which monitors are available. This is the message we send from the Host to the client to outline what monitors are available and what their size and location are. This file is available at:

```
svn://calsvn0/LinQ/trunk/Source/libSharedData/message_controller.h
////////////////////////////////////////////////////////////////
// CSMsg_ControllerRemoteMonitorSetup class
class CSMsg_ControllerRemoteMonitorSetup : public
CSMsg_Controller
{
public:
        CAtlArray<IRemoteMonitorModel::sREMOTEMONITOR>
m_caMonitors;
        // Default Constructor
        CSMsg_ControllerRemoteMonitorSetup( )
                { m_caMonitors.RemoveAll( ); };
        // OutGoing Constructor
        CSMsg_ControllerRemoteMonitorSetup(CAtlArray<IRemote
MonitorModel::sREMOTEMONITOR> &caMonitors)
                { m_caMonitors.Append(caMonitors); };
        // Incoming Constructor
        CSMsg_ControllerRemoteMonitorSetup(CSerializer *
pSerial)
                :CSMsg_Controller(pSerial)
        {
                WORD wNumRect = pSerial->GetWord( );
                for(int i=0; i<wNumRect; i++ )
                {
                        IRemoteMonitorModel::sREMOTEMONITOR
mon;
                        mon.bPrimary = (bool)pSerial->GetBool( );
                        mon.bSharing = (bool)pSerial->GetBool( );
                        CAtlString csString;
                        pSerial->GetString(csString);
                        mon.csName = csString;
                        mon.hMon = (HMONITOR)pSerial->GetDWord( );
                        mon.iDepth = pSerial->GetDWord( );
                        mon.iLastDepth = mon.iDepth;
                        POINT ptTopLeft = pSerial->GetPoint( );
                        POINT ptBotRight = pSerial->GetPoint( );
                        mon.rcMonitor = CRect(ptTopLeft, ptBotRight);
                        m_caMonitors.Add(mon);
                }
        };
        virtual ~CSMsg_ControllerRemoteMonitorSetup( ){ };
        virtual CONTROLLERMESSAGES GetControllerMsgType( ){
return CONTROLLER_REMOTEMONITORSETUP_MSG; };
        virtual CAtlString ToString( )
        {
                CAtlString csTemp;
                csTemp.Format(__T("[CSMsg_ControllerRemoteMonitorSetup
:: %d monitors]"), m_caMonitors.GetCount( ));
                return csTemp + CSMsg_Controller::ToString( );
        }
        virtual int GetSize( )
        {
                int rSize = CSMsg_Controller::GetSize( ) +
sizeof(WORD);
                for(int i = 0; i < (int)m_caMonitors.GetCount( ); i++)
                {
                        rSize += sizeof(BYTE);
                        rSize += sizeof(BYTE);
                        rSize +=
(m_caMonitors[i].csName.GetLength( ))*sizeof(TCHAR) +
sizeof(WORD);
                        rSize += sizeof(DWORD);
                        rSize += sizeof(DWORD);
                        rSize += 8; // 2 points, 4 bytes per point
                }
                return rSize;
        }
        virtual void Serialize(CBufferSerializer * pSerial)
        {
                CSMsg_Controller::Serialize(pSerial);
                WORD wNumMon =
(WORD)m_caMonitors.GetCount( );
                pSerial->PutWord(wNumMon);
                for( int i=0; i<wNumMon; i++ )
                {
                        pSerial->PutByte(m_caMonitors[i].bPrimary);
                        pSerial->PutByte(m_caMonitors[i].bSharing);
                        pSerial->PutString(m_caMonitors[i].csName);
                        pSerial-
>PutDWord(((DWORD)m_caMonitors[i].hMon));
                        pSerial->PutDWord(m_caMonitors[i].iDepth);
                        pSerial-
>PutPoint(m_caMonitors[i].rcMonitor.TopLeft( ));
                        pSerial-
>PutPoint(m_caMonitors[i].rcMonitor.BottomRight( ));
                }
        }
};
```

This message is sent every time the monitor setup on the Host computer changes, or when someone starts or stops sharing to a monitor.

3.) Prompting the Remote Client for a Monitor to Display on:
If there is more than one monitor available when we decide to share, we do:

```
CMultiMonitorDlg dlg;
INT_PTR rv = dlg.DoModal( );
Which launches the Multi-monitor selection dialog:
svn://calsvn0/LinQ/trunk/Source/ZephyrClient/MultiMonitorDlg.cpp
svn://calsvn0/LinQ/trunk/Source/ZephyrClient/MultiMonitorDlg.h
```

When a monitor is selected, the HMONITOR value is sent to the Host computer and the viewing begins on the matching physical display.

What is claimed is:
1. An apparatus for displaying video data from at least one source computer in a multi-monitor computer system, comprising:
 a source computer interface configured to receive at least video data from at least one source computer;
 a multi-monitor interface configured to provide video data to multiple monitors; and
 processing structure configured to coordinate routing of video data via the multi-monitor interface to the monitors based on display requests received from the at least one source computer, during said coordinating, said processing structure configured to:
provide the sizes and availabilities of monitors interconnected to the multi-monitor interface to the at least one source computer; and
for each display request;
check whether the display request comprises a monitor identifier identifying a specific requested monitor;
if the display request comprises a monitor identifier, check whether the specific requested monitor is available;
when the specific requested monitor is available, coordinate routing of video data to the specific requested monitor via the multi-monitor interface and when the specific requested monitor is unavailable, automatically coordinate routing of video data to a different available monitor via the multi-monitor interface;
if the display request does not comprise a monitor identifier, check whether one or more of the monitors are available; and
when one or more of the monitors are available, select one of the available monitors and coordinate routing of video data to the selected available monitor via the multi-monitor interface.

2. The apparatus of claim 1, wherein the source computer interface comprises multiple source computer interface devices, each source computer interface device configured to receive at least video data from a respective source computer.

3. The apparatus of claim 1, wherein the multi-monitor interface comprises multiple monitor interface devices, each monitor interface device configured to provide video data to a respective monitor.

4. The apparatus of claim 1, further comprising:
a storage device configured to store at least video data.

5. The apparatus of claim 1, further comprising:
a network interface configured to send and receive at least video data to and from a remote computer.

6. The apparatus of claim 1, wherein the processing structure is configured to cause the display of an administrator interface for manually granting or denying display requests.

7. A method of displaying video data from at least one source computer in a multi-monitor computer system, comprising:
receiving at least video data from at least one source computer; and
coordinating routing of the received video data to monitors of said multi-monitor computer system based on display requests received from the at least one source computer, wherein said coordinating comprises:
providing the sizes and availabilities of the monitors to the at least one source computer; and
for each display request:
checking whether the display request comprises a monitor identifier identifying a specific requested monitor;
if the display request comprises a monitor identifier, checking whether the specific requested monitor is available;
when the specific requested monitor is available, coordinating routing of video data to the specific requested monitor and when the specific requested monitor is unavailable, automatically coordinating routing of video data to a different available monitor;
if the display request does not comprise a monitor identifier, checking whether one or more of the monitors are available; and
when one or more of the monitors are available, selecting one of the available monitors and coordinating routing of video data to the selected available monitor.

8. The method of claim 7, further comprising:
creating an electronic reservation record to associate the at least one source computer with the requested monitor.

9. The method of claim 7, further comprising:
queuing display requests in the event that video data is already being routed to all of the monitors.

10. The method of claim 7, further comprising:
displaying an administrator interface for manually granting or denying display requests.

11. A non-transitory computer readable medium embodying a computer program for displaying video data from at least one source computer in a multi-monitor computer system, the computer program comprising:
program code for receiving at least video data from at least one source computer; and
program code for coordinating routing of the received video data to monitors of said multi-monitor computer system based on display requests received from the at least one source computer, wherein said program code for coordinating comprises:
program code for providing the sizes and availabilities of the monitors to the at least one source computer; and
for each display request:
program code for checking whether the display request comprises a monitor identifier identifying a specific requested monitor;
if the display request comprises a monitor identifier, program code for checking whether the specific requested monitor is available;
when the specific requested monitor is available, program code for coordinating routing of video data to the specific requested monitor and when the specific requested monitor is unavailable, program code for automatically coordinating routing of video data to a different available monitor;
if the display request does not comprise a monitor identifier, program code for checking whether one or more of the monitors are available; and
when one or more of the monitors are available, program code for selecting one of the available monitors and coordinating routing of video data to the selected available monitor.

12. A system comprising:
at least one source computer;
a plurality of monitors receiving at least video data from said at least one source computer; and
at least one computing device communicating with said at least one source computer and executing a display management procedure, the at least one computing device, during execution of said display management procedure, being configured to coordinate routing of the video data from the at least one source computer to the monitors based on display requests received from the at least one source computer, during said coordinating, said at least one computing device being configured to:
provide the sizes and availabilities of the monitors to the at least one source computer; and
for each display request:

check whether the display request comprises a monitor identifier identifying a specific requested monitor;

if the display request comprises a monitor identifier, check whether the specific requested monitor is available;

when the specific requested monitor is available, coordinate routing of video data to the specific requested monitor and when the specific requested monitor is unavailable, automatically coordinate routing of video data to a different available monitor;

if the display request does not comprise a monitor identifier, check whether one or more of the monitors are available; and when one or more of the monitors are available, select one of the available monitors and coordinate routing of video data to the selected available monitor.

13. The system according to claim 12, wherein during execution of the display management procedure, the at least one computing device is configured to present a user interface for enabling a user to view and grant display requests received from the at least one source computer.

14. The system according to claim 12, comprising a plurality of source computers and wherein each source computer is configured to display a user-selectable icon representing each monitor.

15. The system of claim 14, wherein each source computer is configured to display an availability message for each monitor in association with its icon.

16. The system of claim 15, wherein each availability message comprises, in the event that a respective monitor is associated with a source computer, information identifying the source computer that is currently using the monitor.

17. The system of claim 12, further comprising memory configured to store at least video data from the at least one source computer.

18. The system of claim 12, wherein the at least one computing device during execution of the display management procedure is configured to store a queue of display requests in memory.

19. The system of claim 18, wherein the at least one computing device is configured to enable a user to adjust display requests stored in the queue.

* * * * *